United States Patent [19]

Matsuno et al.

[11] Patent Number: 4,562,443

[45] Date of Patent: Dec. 31, 1985

[54] THERMAL TRANSFER COLOR RECORDING APPARATUS AND RECORDING METHOD

[75] Inventors: Jyunichi Matsuno, Toride; Masataka Kawauchi, Ishioka; Masashi Yoshida, Nakaminayo, all of Japan

[73] Assignee: Hitachi, Ltd., Tokyo, Japan

[21] Appl. No.: 724,924

[22] Filed: Apr. 19, 1985

[30] Foreign Application Priority Data

Apr. 20, 1984 [JP] Japan .................................. 59-78413

[51] Int. Cl.$^{4}$ .............................................. G01D 15/10

[52] U.S. Cl. ................................ 346/76 PH; 400/120; 400/224.2; 400/240.3; 346/134

[58] Field of Search ................. 346/76 PH, 76 R, 1.1, 346/137 C, 134; 400/120, 224.2, 240.3, 240.4; 219/216 PH; 250/319

[56] References Cited

U.S. PATENT DOCUMENTS

| | | | |
|---|---|---|---|
| 4,250,511 | 2/1981 | Stein et al. | 346/139 C |
| 4,492,965 | 1/1985 | Ohnishi et al. | 400/120 |
| 4,505,603 | 3/1985 | Yana | 346/76 PH |

*Primary Examiner*—E. A. Goldberg
*Assistant Examiner*—A. Evans
*Attorney, Agent, or Firm*—Antonelli, Terry & Wands

[57] ABSTRACT

A thermal transfer color recording apparatus comprises a transfer sheet in which a plurality of color inks adapted to be thermally transferred are arrayed in a large number of regions, and a thermal head in which a plurality of heat generating elements adapted to generate heat in response to a picture recording signal are arrayed in the form of a line. The transfer sheet and a recording medium placed one over the other are conveyed in a forward or reverse direction by a platen roller while being depressed by the thermal head, and only the transfer sheet is conveyed without the depression of the thermal head.

When the transfer sheet and the recording medium are conveyed in the forward or reverse direction by the platen roller while being depressed by the thermal head, the picture recording signal corresponding to each color is applied to the thermal head, whereby the plurality of colors of the inks are registered and transferred on the recording medium in succession and in single-color unit, and a color picture is recorded.

7 Claims, 8 Drawing Figures

THERMAL TRANSFER COLOR RECORDING APPARATUS AND RECORDING METHOD

BACKGROUND OF THE INVENTION

The present invention relates to a thermal transfer color recording apparatus in which recording is performed by thermally transferring the color ink of a transfer sheet to a recording medium, and, more particularly, to a thermal transfer color recording apparatus and recording method which transfer and record a plurality of colors in register.

As disclosed in, for example, the official gazette of Japanese Patent Application Laid-Open Application No. 59-42976, a prior-art thermal transfer color recording apparatus comprises recording paper, and a transfer film having a base is divided into color zones coated with inks in a plurality of colors. At the time of a recording operation, in a recording portion composed of a thermal head and a platen roller, the transfer film and the recording paper, placed one over the other with the region of the first color of the former opposed to the latter, are conveyed in a forward direction, and the thermal head is actuated in response to a picture recording signal corresponding to the first color, thereby to transfer and record the first color. After the transfer recording of the first color, only the recording paper is conveyed in a reverse direction to a record starting position, and the transfer film and the recording paper, placed one over the other with the region of the second color of the former opposed to the latter, are conveyed in the forward direction again, thereby to transfer and record the second color. These operations are thereafter repeated to transfer the plurality of colors in register, whereby the color recording is carried out.

In such color recording, the transfer of the color ink is effected only when the recording paper is conveyed in the forward direction. Therefore, each time one color is transferred and recorded, the recording paper must be conveyed in the reverse direction to the record starting position.

In this manner, at the transfer recording operation, the recording paper is conveyed in the forward direction while being depressed against the platen roller by the thermal head along with the transfer film. In contrast, at a returning operation, the recording paper is conveyed in the reverse direction by the platen roller without being depressed by the thermal head.

Accordingly, the recording paper undergoes a feed error due to the difference of the magnitudes of deformation and slip of the platen roller at the times of the forward conveyance and the reverse conveyance. For this reason, it is difficult to locate the recording paper to the record starting position by the reverse conveyance thereof, and clear color picture recording is difficult.

Additionally, in such color recording, a period of time for conveying the recording paper in the reverse direction, apart from the positioning conveyance of the transfer film, is required separately from a recording period of time. This leads to the problem that shortening the recording period of time is difficult.

An object of the present invention is to provide a thermal transfer color recording apparatus and recording method in which a plurality of colors can be recorded on a recording medium in register at a high register recording position accuracy.

A thermal transfer color recording apparatus according to the present invention comprises a transfer sheet in which a plurality of types of color inks, adapted to be thermally transferred, are arrayed on a large number of different regions of a base thereof, and a thermal head in which a plurality of heat generating elements, adapted to generate heat in response to a picture recording signal, are disposed in the form of a line. When a picture is recorded, the transfer sheet and a recording medium, placed one over the other, are conveyed a forward direction or a reverse direction by a platen roller while being depressed by the thermal head actuated in response to the picture recording signal. Further, only the transfer sheet can be conveyed by conveyance means.

In this manner, the platen roller rotates forwardly or reversely under the pressure of the thermal head so as to convey the transfer sheet and the recording medium the forward or reverse direction. Since the pressures of the thermal head in both the forward and reverse conveying directions are equal and remain unchanged, the platen roller does not undergo any difference in the magnitudes of deformation during the conveying operations in both the directions.

DETAILED DESCRIPTION

Figure 1:
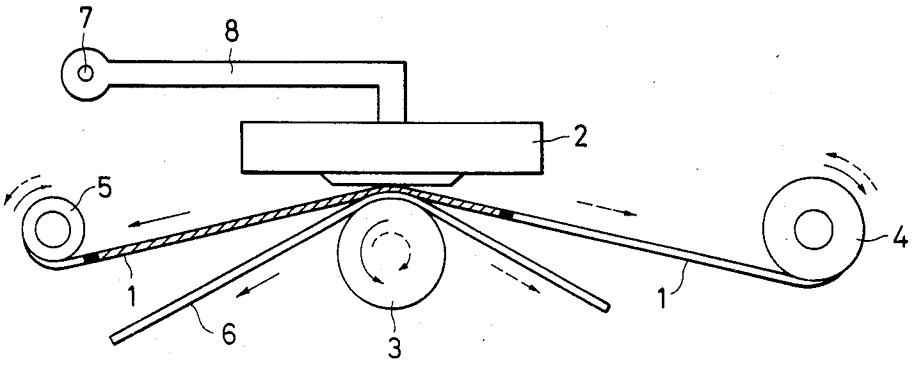
FIG. 1 is a side view schematically showing portions of an embodiment of a thermal transfer color recording apparatus according to the present invention.
Figure 2:
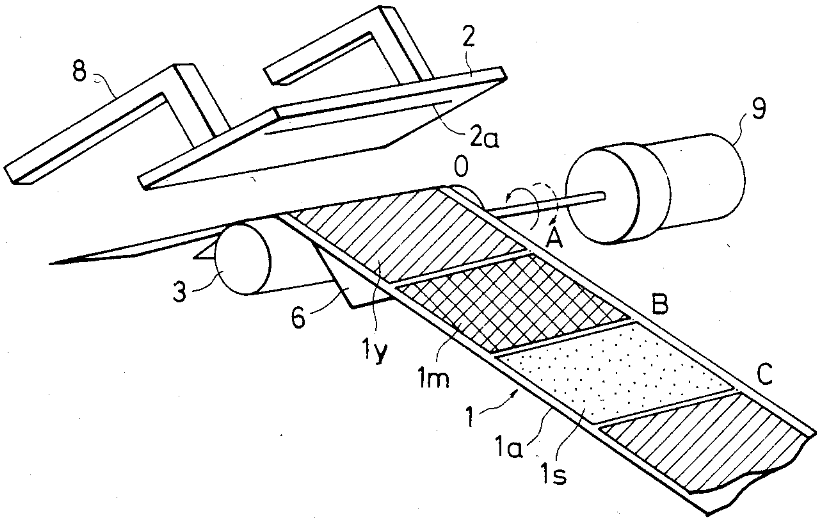
FIG. 2 is a schematic perspective view of portions of the embodiment shown in FIG. 1.
Figure 3:
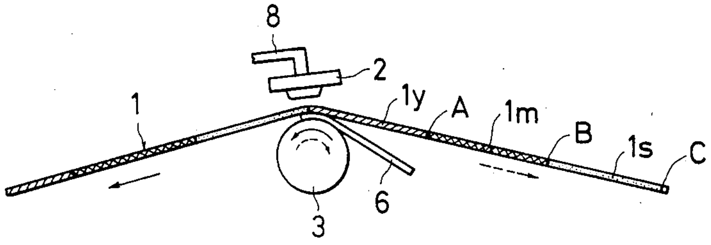
FIGS. 3 to 8 are schematic side views for explaining the operations of the embodiment shown in FIGS. 1 and 2.

Referring now to the drawings, wherein like reference numerals are used throughout the various views to designate like parts and, more particularly, to FIGS. 1 and 2, according to these figures, a transfer sheet, for example, transfer film 1 having a base of plastic material such as polyethylene or polyester, is wound on a delivery reel 4 and a take-up reel 5 while passing between a thermal head 2 and a platen roller 3. The transfer film 1 includes ink portions in the respective colors of yellow 1*y*, magenta 1*m* and cyan 1*s*, which are melted or sublimed by heat into transferrable states, with the respective colors being successively applied in regions of fixed length and at equal intervals on the base 1*a*. Recording paper 6, a recording medium disposed in opposition to the transfer film 1 between the thermal head 2 and the platen roller 3, and is arranged so that the inks of the transfer film 1 are transferred thereto in a recording operation.

In the embodiment of FIGS. 1 and 2, the recording paper 6 is cut paper of fixed size. Accordingly, the ink coating regions of the transfer film 1 correspond to the recording picture frame size of the cut paper.

In the thermal head 2, a large number of heat generating elements 2*a*, which generate heat in response to picture recording signals, are disposed in the widthwise direction of the recording paper 6, namely, in the line direction of the recording paper 6. Thus, the thermal head 2 can record one line of a picture to-be-recorded without being subjected to mechanical scanning in the widthwise direction of the recording paper 6. Additionally, the thermal head 2 is attached to a supporting member 8 which is pivotably held by a fulcrum 7.

The supporting member 8 normally urges the thermal head 2 toward the platen roller 3 by depression means, not shown. It is adapted to slightly turn against the pressure of the depression means at need, whereby the thermal head 2 comes away from the transfer film 1.

The platen roller 3 is connected to a driving source such as, for example, a stepping motor 9, capable of forward and reverse rotation, transfer for conveying the film 1 and engaged recording paper 6, in a forward direction or reverse direction by one line each time one line is recorded. The conveyance of the transfer film 1 and recording paper 6 in the forward or reverse direction is effected while a fixed tension is applied by the platen roller 3, and besides, a driving source connected to the delivery reel 4 as well as the take-up reel 5 for the transfer film 1 and conveyance means, not shown, for the recording paper 6.

First, the supporting member 8 is turned counterclockwise to slightly float the thermal head 2 from the platen roller 3, and the delivery reel 4, the take-up reel 5, the platen roller 3, and the conveyance means (not shown) for the recording paper 6 are driven. Thus, the transfer film 1 and the recording paper 6, placed one over the other, are conveyed until the initial end part of a picture frame for forming a picture on the recording paper 6 and the initial end part of the yellow portion 1*y* on the transfer film 1 are brought to a home position of the point of contact 0 (FIG. 2) between the thermal head 2 and the platen roller 3.

The predetermined positioning control of the transfer film 1 as well as the recording paper 6 and the positioning control thereof to the home position are carried out upon detecting positioning marks, not shown, applied on the transfer film 1, the recording paper 6 or/and the platen roller 3.

Under this state, the supporting member 8 is turned clockwise to depress the thermal head 2 toward the platen roller 3. A picture recording signal corresponding to yellow of the first color is applied to the thermal head 2 by control means so as to permit recording in a forward direction. Each time one line is recorded, the delivery reel 4, take-up reel 5 and platen roller 3 are rotated in the direction of arrows indicated by solid lines in FIG. 1, that is, the forward direction, so that the transfer film 1 and the recording paper 6, placed one over the other, are conveyed in the forward direction in line unit. When the transfer of the last line has ended, the transfer film 1 and the recording paper 6 are stopped. In this manner, only the color yellow is transferred to the recording paper 6 from the initial end side of the picture frame (the first line side) toward the terminal end side thereof (the last line side), and a picture of only yellow is formed on the recording paper 6.

Figure 4:
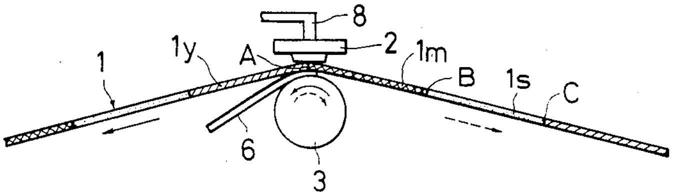
Figure 5:
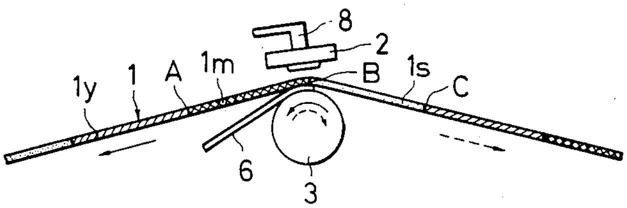

After the transfer recording of yellow, the terminal end part A of the yellow color portion 1*y* of the transfer film 1, which is also the initial end part of the magenta portion 1*m*, and the terminal end part or the last line part of the picture frame of the recording paper 6 lie at the home position as shown in FIG. 4. Subsequently, the supporting member 8 is turned counterclockwise to slightly float the thermal head 2 from the platen roller 3. In this condition, the delivery reel 4 and the take-up reel 5 are rotated in the direction of the arrows in the solid lines (in the forward direction) to convey only the transfer film 1 in the direction of the arrow in the solid line (in the forward direction) and to bring the terminal end part B of the magenta portion 1m of the transfer film 1 (which is also the initial end part of the cyan portion 1*s*) to the home position. (Refer to FIG. 5.)

Next, the supporting member 8 is turned clockwise again to depress the thermal head 2 against the platen roller 3. A picture recording signal, corresponding to magenta of the second color, is applied to the thermal head 2 by the control means so as to permit recording in the mode of reverse conveyance. Each time one line is recorded, the delivery reel 4, take-up reel 5 and platen roller 3 are rotated in the directions of arrows in broken lines (in the reverse direction), so that the transfer film 1 and the recording paper 6, placed one over the other, are conveyed in the reverse direction in line unit. When the transfer of the first line of the picture frame has ended, the transfer film 1 and the recording paper 6 are stopped. In this way, the color magenta is transferred to the recording paper 6 from the terminal end side of the picture frame (the last line side) toward the initial end side thereof (the first line side) in register with the picture recorded in yellow, and a picture of both yellow and magenta is formed on the recording paper 6.

Figure 6:
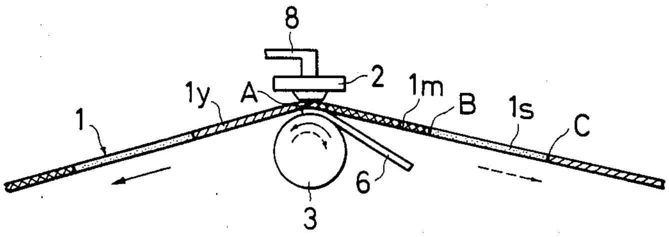

After the registered transfer of magenta, the initial end part A of the magenta portion 1*m* of the transfer film 1 (which is also the terminal end part of the yellow portion 1*y*) and the initial end part (the first line part) of the picture frame of the recording paper 6 lie at the home position. (Refer to FIG. 6.)

Figure 7:
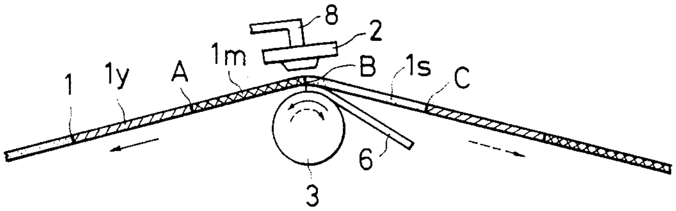

At the next step, the supporting member 8 is turned counterclockwise again to slightly float the thermal head 2 from the platen roller 3. Under these conditions, the delivery reel 4 and the take-up reel 5 are rotated in the directions of the arrows in the solid lines (in the forward direction) to convey only the transfer film 1 in the direction of the arrow in the solid line (in the forward direction) and to bring the initial end part B of the cyan portion 1*s* of the transfer film 1 (which is also the terminal end part of the magenta portion 1*m*) to the home position. (Refer to FIG. 7.)

Next, the supporting member 8 is turned clockwise again to depress the thermal head 2 against the platen roller 3. A picture recording signal corresponding to cyan of the third color is applied to the thermal head 2 by the control means so as to permit recording in the mode of forward conveyance. Each time one line is recorded, the delivery reel 4, take-up reel 5 and platen roller 3 are rotated in the directions of the arrows in the solid lines (in the forward direction), so that the transfer film 1 and the recording paper 6, placed one over the other, are conveyed in the forward direction in line unit. When the transfer of the last line of the picture frame has ended, the transfer film 1 and the recording paper 6 are stopped. In this way, the color cyan is transferred to the recording paper 6 from the initial end side of the picture frame (the first line side) toward the terminal end side thereof (the last line side) in register with the picture recorded in yellow and magenta, and a picture of all of yellow, magenta and cyan is formed on the recording paper 6.

Figure 8:
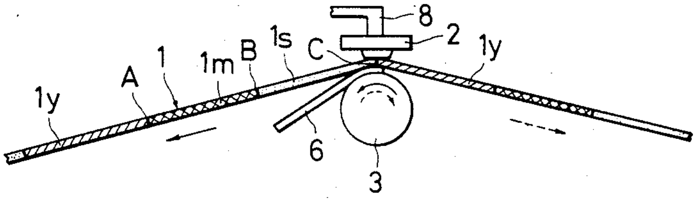

After the registered transfer of cyan, the terminal end part C of the cyan portion 1*s* of the transfer film 1 (which is also the initial end part of the next yellow portion 1*y*) and the terminal end part (the last line part) of the picture frame of the recording paper 6 lie at the home position. (Refer to FIG. 8.)

As thus far described, a series of thermal transfer color recording operations end. In this manner, the tricolor transfer recording is executed by conveying the recording paper 6 by one and half reciprocations. Since the conveying speed of the recording paper 6 is lower than that of the transfer film 1, a reduction in the number of reciprocating motions of the recording paper 6 leads to shortening the recording period of time.

In the above registered transfer, the timing of application of the picture recording signals to the thermal head 2 by the control means, the one-line feed and positioning operations of the transfer film 1 and recording paper 6, etc. are determined or performed upon detecting the positioning marks affixed to the transfer film 1, recording paper 6, platen roller 3, etc. While, in the foregoing embodiment, the transfer film 1, made of plastic material is used as the transfer sheet, it may well be replaced with a transfer paper. While, as the transfer inks, those in the three colors of yellow, magenta and cyan are successively applied, the number of colors need not be restricted to three. While the cut paper of fixed size is employed as the recording medium, it may well be replaced with continuous paper. In case of using the continuous paper, however, tension application means are necessary so that a fixed tension may be exerted during the recording conveyance and, additionally, cutter means are required for cutting each picture recording portion.

As set forth above, according to the present invention, the multiple transfer recording can be performed in both the forward direction and the reverse direction, so that a difference in the magnitude of deformation of a platen roller 3, attributed to the pressure of a thermal head 2, does not occur during the transfer recording, thereby avoiding error in the feed of the recording medium in the forward and reverse directions. Therefore, a high positional accuracy can be ensured among the thermal head 2, a transfer sheet 1 and the recording medium 6, and a highly clear color picture can be obtained. Moreover, since the number of reciprocating motions of the recording medium can be reduced, the recording period of time can be shortened.

We claim:

1. A thermal transfer color recording apparatus having a thermal head including a plurality of heat generating elements for generating heat in response to a picture signal disposed in a line, control means for controlling the heat generation of the thermal head, a platen roller arranged in opposition to the thermal head, depression means for depressing the thermal head against the platen roller, and a transfer sheet having a plurality of thermally transferrable color inks arrayed on a number of different regions of a base of the transfer sheet, so that the color inks of the transfer sheet are register-transferred to a recording medium between the thermal head and the platen roller in succession and in single-color unit by actuation of the thermal head, transfer sheet conveyance means for conveying only said transfer sheet located between said thermal head and said platen roller, a conveyance system for conveying the recording medium and said transfer sheet placed one over the other between said thermal head and said platen roller in a forward direction and a reverse direction in synchronism with an actuation control of said thermal head as well as a drive control of said platen roller while subjecting said recording medium and said transfer sheet to a pressure of said thermal head.

2. A thermal transfer color recording apparatus according to claim 1, wherein said thermal head is supported by a supporting member which has a pressure exerting mechanism.

3. A thermal transfer color recording apparatus according to claim 1, wherein said transfer sheet has one side edge wound around delivery means and the other side edge wound around take-up means through a position between said thermal head and said platen roller, and wherein tension application means for applying a fixed tension, during the conveyance of said transfer sheet, is connected to said delivery means and said take-up means.

4. A thermal transfer color recording apparatus according to claim 1, wherein said recording medium is cut paper of fixed size.

5. A thermal transfer color recording apparatus according to claim 1, wherein said recording medium is continuous paper of fixed width, and tension application means for respectively applying fixed tensions to a feed-in side and feed-out side of said platen roller during the conveyance is connected to said continuous paper.

6. A thermal transfer color recording method for an apparatus including a thermal head, having a plurality of heat generating elements for generating heat in response to a picture signal, disposed in a line, control means for controlling a heat generation of the thermal head, a platen roller arranged in opposition to the thermal head, depression means for depressing the thermal head against the platen roller, and a transfer sheet having a plurality of thermally transferrable color inks arrayed on a number of different regions of a base of the transfer sheet, so that the color inks of the transfer sheet are registertransferred to a recording medium between the thermal head and the platen roller in succession and in single-color unit by actuation of the thermal head, the thermal transfer color recording method comprising causing a picture frame of said recording medium to correspond to one color region of said transfer sheet when the color inks of said transfer sheet are registered and transferred on the recording medium in succession and in single-color unit, conveying said transfer sheet and said recording medium, placed one over the other, in a forward direction and a reverse direction by one color region of said transfer sheet while subjecting the same to a pressure by said thermal head, actuating said thermal head in response to the picture recording signal at this time, beginning a transfer operation of the next color only after said transfer sheet is conveyed in the forward direction by one color region under a state which the pressure by said thermal head is removed and between the transfer of one color and the register transfer of the next color.

7. A thermal transfer color recording method according to claim 6, wherein when the respective color inks of said transfer sheet are registered and transferred on said recording medium in succession and in single-color unit, an initial end part of the first color of said transfer sheet and an initial end part of a picture frame of said recording medium are first caused to correspond to a home position between said thermal head and said platen roller, and said transfer sheet and said recording medium, placed one over the other, are subsequently conveyed in the forward direction while said thermal head is maintained in pressing engagement therewith, said thermal head being actuated by a picture signal corresponding to the first color, to transfer and record the first color on said recording medium, and wherein, when the transfer of the first color has ended, the pressure of said thermal head is removed and then only said transfer sheet is conveyed in the forward direction to bring a terminal end part of the second color to the home position, and said transfer sheet and said recording medium are subsequently conveyed in the reverse direction while said thermal head is maintained in a pressing engagement therewith, said thermal head being actuated by a picture signal corresponding to the second color, to transfer the second color on said recording medium in register with the first color, and wherein, when the transfer of the second color has ended, the pressure of said thermal head is removed and then only said transfer sheet is conveyed in the forward direction to cause an initial end part of the third color to correspond to the home position, and said transfer sheet and said recording medium are subsequently conveyed in the forward direction while said thermal head is maintained in a pressing engagement therewith, said thermal head being actuated by a picture signal corresponding to the third color to transfer the third color on said recording medium in register with the first and second colors, and repeating the above operations to thereby register and transfer the respective inks on said recording medium so as to record a picture.

* * * * *